(12) United States Patent
Yokoi et al.

(10) Patent No.: US 11,327,653 B2
(45) Date of Patent: May 10, 2022

(54) DRIVE BOX, STORAGE SYSTEM AND DATA TRANSFER METHOD

(71) Applicant: Hitachi, Ltd., Tokyo (JP)

(72) Inventors: Nobuhiro Yokoi, Tokyo (JP); Hirotoshi Akaike, Tokyo (JP); Ryosuke Tatsumi, Tokyo (JP); Koji Hosogi, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 16/810,575

(22) Filed: Mar. 5, 2020

(65) Prior Publication Data

US 2021/0042032 A1 Feb. 11, 2021

(30) Foreign Application Priority Data

Aug. 6, 2019 (JP) .............................. JP2019-144573

(51) Int. Cl.
*G06F 3/06* (2006.01)
*G11B 33/04* (2006.01)
*G06F 12/02* (2006.01)

(52) U.S. Cl.
CPC .......... *G06F 3/0604* (2013.01); *G06F 3/0634* (2013.01); *G06F 3/0689* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 6,269,424 B1 * 7/2001 Katsuragi ........... G06F 11/1076
711/155
6,657,812 B2 * 12/2003 Serizawa ............. G11B 33/121
360/97.16
(Continued)

FOREIGN PATENT DOCUMENTS

JP 2013-532339 A 8/2013
JP 2018-173959 A 11/2018

OTHER PUBLICATIONS

R. Zimmermann and S. Ghandeharizadeh, "Highly available and heterogeneous continuous media storage systems," in IEEE Transactions on Multimedia, vol. 6, No. 6, pp. 886-896, Dec. 2004 (Year: 2004).*

(Continued)

*Primary Examiner* — Daniel C. Chappell
(74) *Attorney, Agent, or Firm* — Volpe Koenig

(57) ABSTRACT

A storage system for continuing I/O without affecting drive box addition to a host computer includes: a plurality of drive boxes for connecting to a computer device that transmits commands for data reads or writes; and a storage controller connected to the drive boxes. A first drive box provides a first storage region to the computer device. The storage controller manages correspondence between the first storage region and a physical storage region of the drives constituting the first storage region. The first drive box receives a command for the first storage region from the computer device and transfers the command to the storage controller.

(Continued)

The storage controller generates a data transfer command including a data storage destination based on the address management table, and transfers the command to the first drive box. The first drive box then transfers the data transfer command to the second drive box.

9 Claims, 12 Drawing Sheets

(52) U.S. Cl.
CPC ...... G06F 12/0238 (2013.01); G11B 33/0405 (2013.01); *G06F 2212/1008* (2013.01); *G06F 2212/21* (2013.01)

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | |
|---|---|---|---|
| 6,970,973 B2* | 11/2005 | Katsuragi | G06F 3/0631 |
| | | | 711/112 |
| 9,800,661 B2 | 10/2017 | Ori | |
| 9,864,527 B1* | 1/2018 | Srivastav | G06F 3/065 |
| 10,860,475 B1* | 12/2020 | Coleman | G06F 3/061 |
| 10,901,626 B1* | 1/2021 | Mizuno | G06F 3/0688 |
| 2005/0114876 A1* | 5/2005 | Atarashi | G11B 33/1406 |
| 2012/0079318 A1* | 3/2012 | Colgrove | G06F 11/108 |
| | | | 714/6.22 |
| 2013/0204849 A1* | 8/2013 | Chacko | H04L 67/1097 |
| | | | 707/692 |
| 2017/0185563 A1* | 6/2017 | Underwood | G06F 13/00 |
| 2019/0197000 A1* | 6/2019 | Kurokawa | G06F 3/0607 |
| 2020/0057573 A1* | 2/2020 | Nakanishi | G06F 3/0659 |
| 2020/0264806 A1* | 8/2020 | Nogi | G06F 3/0659 |
| 2020/0334103 A1* | 10/2020 | Miyoshi | G06F 11/1076 |

OTHER PUBLICATIONS

S. J. T. Schwarz, A. Amer and J. Rose, "RESAR: Reliable storage at exabyte scale reconsidered," 2017 2nd International Conference on Communication Systems, Computing and IT Applications (CSCITA), 2017, pp. 84-89 (Year: 2017).*

A. Di Marco and G. Ciaccio, "Efficient many-to-one communication for a distributed RAID," Sixth IEEE International Symposium on Cluster Computing and the Grid (CCGRID'06), 2006, pp. 8 pp. -445 (Year: 2006).*

S. B. Narasimhamurthy, P. C. Gurumohan, S. Sreenivasamurthy and J. Y. Hui, "Quanta data storage: an information processing and transportation architecture for storage area networks," in IEEE Journal on Selected Areas in Communications, vol. 23, No. 10, pp. 2032-2040, Oct. 2005 (Year: 2005).*

Japanese Office Action dated May 13, 2021 for Japanese Patent Application No. 2019-144573.

* cited by examiner

| ACCESS FREQUENCY | TARGET DRIVE BOX | DATA MOVEMENT DETERMINATION |
|---|---|---|
| ≤ THRESHOLD | SOURCE | MOVE TO OTHER |
|  | OTHER | NO MOVEMENT |
| >THRESHOLD | SOURCE | NO MOVEMENT |
|  | OTHER | MOVE TO SOURCE |

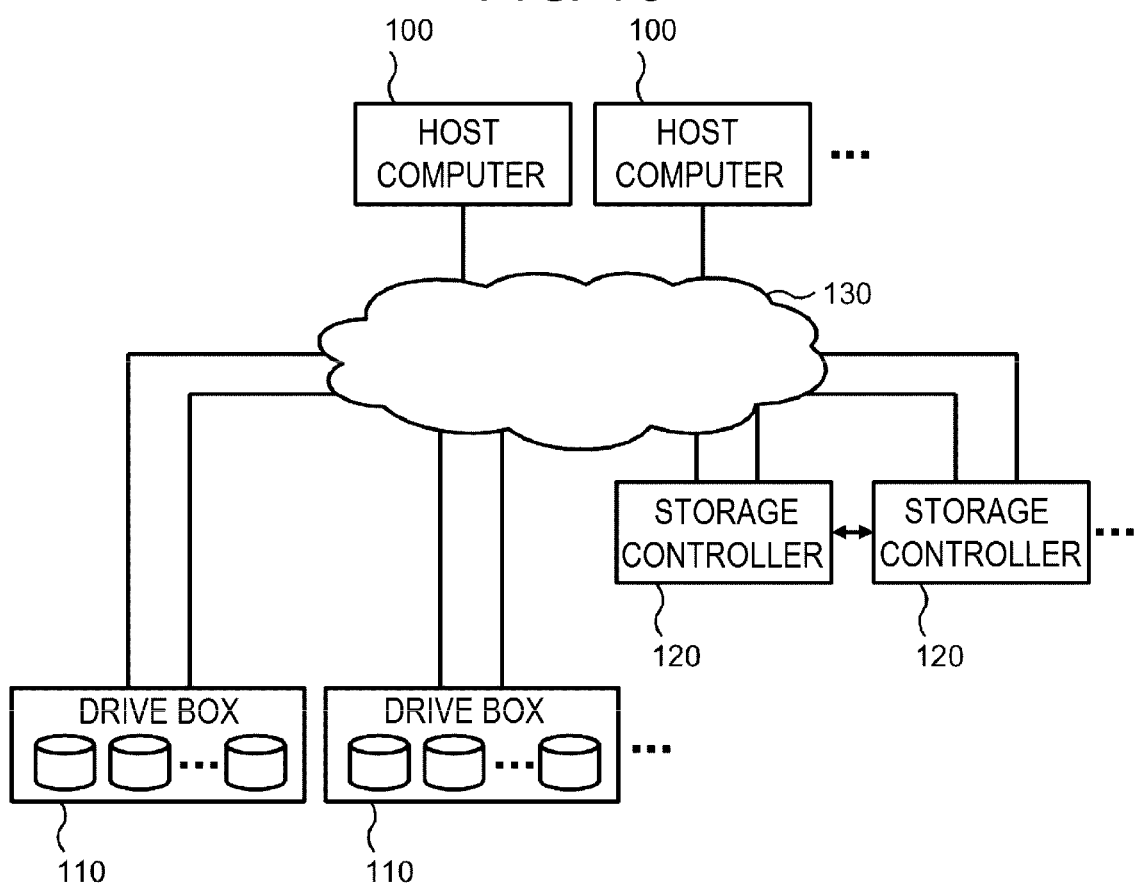

DRIVE BOX, STORAGE SYSTEM AND DATA TRANSFER METHOD

BACKGROUND OF THE INVENTION

1. Field of the Invention

The present invention relates generally to a drive box, a storage system, and a data transfer method of a storage system, and is suitable for application to, for example, a system mounted with a flash drive.

2. Description of the Related Art

In a storage system, a host computer is connected to a front-end network of a storage, and a drive box is connected to a back-end network independent of the front-end network.

When a command from the host computer is received by a storage controller, for example, in a case of a read command, the storage controller reads data from a drive in the drive box and transfers the data to the host computer.

In related art, the front-end network is mainly a Fibre Channel (FC) network or Ether network, the back-end network is mainly a Serial Attached SCSI (SAS) network, and the drive box is Just a Bunch Of Disks (JBOD), and a plurality of SAS/SATA drives that stores data are mounted in slots of the drive box.

In recent years, in order to improve performance of a storage system, a flash drive such as a solid state drive (SSD) aiming at high performance has appeared, and an optimal NVMe protocol for a flash drive has been standardized.

Further, for high expandability of drive connection by network connection, the NVMe over Fabrics (NVMeoF) standard which can use the NVMe protocol on a network has appeared, and Fabric-attached Bunch of Flash (FBOF) which is a drive box that supports the NVMe-oF has appeared.

However, since data transfer path between the host computer, the storage controller, and the drive box is the same as in the related art, even if a plurality of FOBFs are installed as drive boxes, there is a problem that a data transfer bandwidth of the storage controller becomes a bottleneck, and the performance of the FBOF cannot be brought out.

For this purpose, Description of U.S. Pat. No. 9,800,661 (PTL 1) discloses that a bottleneck in a data transfer bandwidth of a storage controller is eliminated by integrating the front-end network and the back-end network, connecting the host computer, the storage controller, and the drive box directly to a common network so as to transfer data.

For example, PTL 1 discloses that agent software operating on the host computer queries a drive in the FBOF corresponding to access destination data of the host computer and an address thereof to the storage controller, and accesses the drive in the FBOF directly based on obtained information.

According to PTL 1, since the host computer and the FBOF are directly connected, the host computer can directly access the drive of the FBOF. Meanwhile, in the agent software, it is necessary to perform control and calculation for storage function, and a calculation load for performing highly reliable processing is applied to the host computer side.

For example, synchronization between operation of storage device functions such as data protection functions such as RAID, snapshots, that operate on the storage controller and the operation of the agent software is required, and control via a network is required, which may degrade performance.

Further, when a virtualized storage capacity greater than a total capacity of the drives mounted in the FBOF is defined by thin provisioning, it is necessary to add a new FBOF when a capacity exceeding the total capacity of the drives is used.

In the related art, since the storage controller between the host computer and the FBOF hides physical changes of the FBOF from the host computer, no changes to the host computer are necessary even when a new FBOF is added. However, in the configuration of PTL 1, since the host computer and the FBOF are directly connected, it is necessary to deal with the physical configuration change on the host computer side.

SUMMARY OF THE INVENTION

Therefore, an object of the invention is to provide a drive box, a storage system, and a data transfer method that, in a configuration in which a host computer and an FBOF are directly connected, do not need to change setting of the host computer even when a capacity is increased by adding a drive or the like.

One embodiment of a storage system for achieving the above object is a storage system including: a plurality of drive boxes configured to be connected via a network to a computer device that transmits a command for data read or data write, each of the drive boxes being mounted with a drive that is a storage device; and a storage controller connected to the plurality of drive boxes. A first drive box among the plurality of drive boxes is configured to provide a first storage region to the computer device. The storage controller is configured to store an address management table for managing correspondence between the first storage region and a physical storage region of the drives constituting the first storage region. The first drive box is configured to, when receiving a command for the first storage region from the computer device, transfer the command to the storage controller. The storage controller is configured to, after receiving the command, generate a data transfer command including information of a data storage destination based on the address management table, and transfer the data transfer command to the first drive box. The first drive box is configured to, after receiving the data transfer command, when the data storage destination included in the data transfer command is a second drive box among the plurality of drive boxes, transfer the data transfer command to the second drive box.

According to representative embodiments of the invention, in a configuration in which data is directly transferred between a host computer and a drive box, expansion of the capacity by adding a drive, a drive box, or the like can be implemented without changing setting of the host computer.

Problems, configurations, and effects other than those described above will be further clarified with the following description of embodiments.

BRIEF DESCRIPTION OF THE DRAWINGS

FIG. 13 is a block diagram showing a configuration example of network commonalization of an information system according to the second embodiment.

DESCRIPTION OF THE PREFERRED EMBODIMENTS

Figure 1:
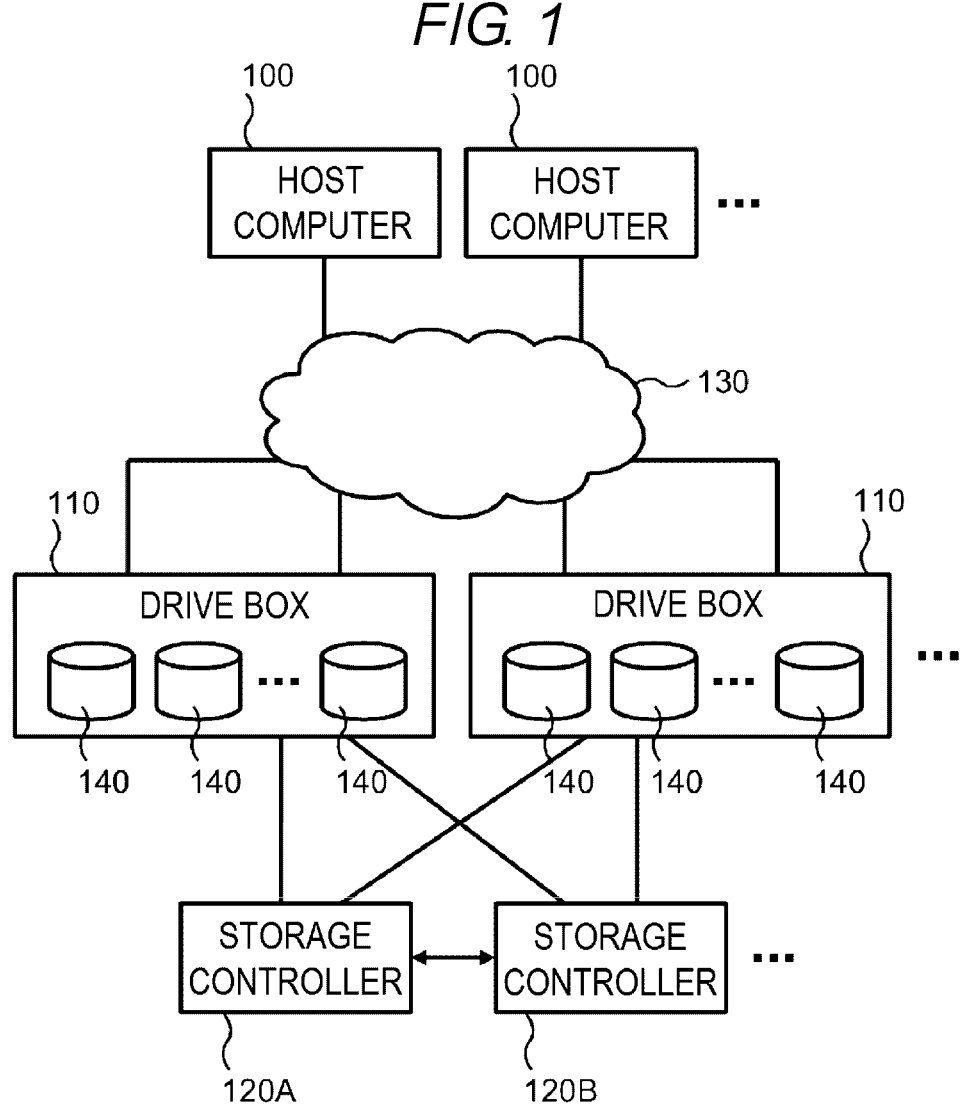
FIG. 1 is a block diagram showing a configuration example of an information system according to a first embodiment.

Embodiments of the invention will be described below with reference to the drawings.

The following description and drawings are examples for illustrating the invention, and are omitted and simplified as appropriate for clarification of the description. The invention may be embodied in various other forms, and the invention may be carried out in various other forms, and may be singular or plural.

Embodiments described below do not limit the invention according to the claims, and all of the elements and combinations thereof described in the embodiments are not necessarily essential to the solution to the problem.

In the following description, various kinds of information may be described in terms of expressions such as "table", "list", "queue", "DB". However, the various kinds of information may be expressed by other data structures, "xxx table", "xxx list", "xxx queue", "xxx DB", and the like may be referred to as "xxx information" or the like in order to show that the information is not dependent on the data structure.

In the following description, when identification information is described, expressions such as "identification information", "identifier", "name", "ID", and "number" are used, but these expressions may be replaced with each other.

In the following description, when there are a plurality of components having the same or similar functions, the description will be basically given the same reference numerals. However, means for implementing the functions may be different even if the functions are the same.

Further, the embodiments of the invention described below may be implemented by software running on a general-purpose computer, or may be implemented by dedicated hardware or a combination of software and hardware.

In the following description, processing may be described with a "program" as a subject, where the program is executed by a processor (for example, a central processing unit (CPU)), and for predetermined processing, appropriately uses a storage resource (for example, a memory) and/or an interface device (a communication port) or the like. Therefore, the subject of the processing may be described as a processor.

The processing described with the program as a subject may be processing performed by a computer (for example, a calculation host or a storage device) having a processor.

In the following description, the expression "controller" may refer to a processor or a hardware circuit that performs a part or all of the processing performed by the processor.

The program may be installed on each computer from a program source (for example, a program distribution server or a computer-readable storage medium). In this case, the program distribution server includes a CPU and a storage resource, and the storage resource further stores a distribution program and a program to be distributed, and the CPU of the program distribution server may distribute the program to be distributed to another computer by the CPU executing the distribution program.

Two or more programs may be implemented as one program, or one program may be implemented as two or more programs in the following description.

In the following description, "PDEV" refers to a physical storage device, and may typically be a non-volatile storage device (for example, an auxiliary storage device). The PDEV may be, for example, a hard disk drive (HDD) or a solid state drive (SSD). Different types of PDEVs may be mixed in the storage system.

In the following description, "RAID" is an abbreviation for Redundant Array of Inexpensive Disks. A RAID group is configured with a plurality of PDEVs (typically the same type of PDEV) and stores data according to a RAID level associated with the RAID group. The RAID group may be referred to as a parity group. The parity group may be, for example, a RAID group that stores parity.

In the following description, "VOL" is an abbreviation for volume, and may be a physical storage device or a logical storage device. The VOL may be a substantive VOL (RVOL) or a virtual VOL (VVOL). The "RVOL" may be a VOL based on a physical storage resource (for example, one or more RAID groups) of the storage system having the RVOL. The "VVOL" may be any one of an external connection VOL (EVOL), a capacity expansion VOL (TPVOL), and a snapshot VOL. The EVOL is based on a storage space of an external storage system (for example, the VOL), and may be a VOL according to a storage virtualization technique. The TPVOL is configured with a plurality of virtual regions (virtual storage regions) and may be a VOL according to a capacity virtualization technique (typically, thin provisioning).

"POOL" is a logical storage region (for example, a set of a plurality of Pool VOLs), and may be prepared for each usage. For example, the pool may be a TP pool. The TP pool may be a storage region configured with a plurality of pages (substantial storage regions). When a page is not allocated to a virtual region (a virtual region of the TPVOL) to which an address specified by a write request received from a host computer (hereinafter, referred to as a host) belongs, the storage controller allocates the page from the TP pool to the virtual region thereof (a write destination virtual region) (even if the page is already allocated to the write destination virtual region, the page may be newly allocated to the write destination virtual region). A "pool VOL" may be a VOL that is a component of the pool. The pool VOL may be RVOL or EVOL.

In the following description, a VOL recognized by a host (a VOL provided to a host) is referred to as an "LDEV". In the following description, the LDEV is TPVOL (or RVOL), and the pool is a TP pool. However, the invention is also applicable to a storage apparatus in which a capacity expansion technique (thin provisioning) is not adopted.

In the following description, a volume in SCSI is referred to as a "logical unit (hereinafter, LU)". The LU corresponds to LDEV at 1:N when the LU Size Expansion (hereinafter, LUSE) function is applied.

In the following description, a volume in NVMe is referred to as "name space (hereinafter, NS)". An NS corresponds to the LU in SCSI.

First Embodiment

In the first embodiment, in an information system including a host computer, a storage controller, and a drive box, data is directly transferred between the host computer and the drive box while a data storage destination is managed by a highly reliable storage controller. When a drive box is added, the data is transferred between the drive box and the host computer and via the originally connected drive box (referred to as two-stage transfer). Further, by optimizing data arrangement, overhead of the two-stage transfer is prevented.

FIG. 1 is a block diagram showing a configuration example of an information system according to a first embodiment.

An information processing system according to the first embodiment includes one or a plurality of host computers 100, and one or a plurality of drive boxes 110 on which one or a plurality of drives 140 as storage devices are mounted. The host computer 100 and the drive box 110 are connected to each other via a network 130 such as a local area network (LAN) or the Internet. A storage controller 120, which has one or a plurality of duplicated structures, are connected by Local Area Network (LAN), PCI Express, or the like.

The storage controller 120 and the drive box 110 constitute a storage system. For example, an FBOF may be used as the drive box 110.

The network 130 is a high-performance network such as Ethernet (registered trademark), Infiniband (registered trademark), and supports NVMe over Fabrics (NVMe-oF).

The host computer 100 is a computer device including a storage device such as a central processing unit (CPU) and a memory, and transmits a write command or a read command (an IO command) to the storage system including the drive box 110 and the storage controller 120 via the network 130 in response to user operation or a request from an implemented program.

The host computer 100, via the network 130, performs protocol control at the time of communication with the storage controller 120, and exchanges data with the drive box 110.

The storage system includes a storage controller 120A and a storage controller 120B that are redundant in order to provide a function as a storage to the host computer 100. The storage controller 120 includes a CPU and a storage device such as a memory. The storage controller 120A and the storage controller 120B have the same configuration.

The storage controller 120 includes one or a plurality of CPU cores, and each CPU core instructs transfer of data stored in the corresponding drive box 110 in response to the read command or the write command from the host computer 100.

The memory of the storage controller 120 is configured with, for example, a semiconductor memory such as a synchronous dynamic random access memory (SDRAM), and may be configured in combination with a non-volatile memory such as a storage class memory (SCM). As a main memory of the CPU, an execution program (a storage control program or the like), a management table referred to by the CPU, and the like are stored. The memory is also used as a disk cache (a cache memory) of the storage controller 120.

The storage controller 120 has, for example, an interface with the drive box 110, and communicates information related to processing related to storage processing such as data transfer and data copying instructed from the host computer 100 with the drive box 110.

The drive box 110 is mounted with one or a plurality of drives 140, is connected to the host computer 100 via the network 130, and stores data of the host computer 100. Further, in accordance with an instruction from the storage controller 120, data transfer with the host computer 100 is performed.

The drive box 110 may have, for example, redundant paths, and may be configured to be able to perform data communication with the host computer 100 even when one of the paths is disconnected. Further, the drive box 110 may also have redundant paths with the storage controller 120, and similarly, may be configured to be able to communicate with the storage controller 120 even when one of the paths is disconnected.

The drive box 110 stores an OS, a storage control program, a backup of the management table, and the like. The drive 140 mounted on the drive box 110 is, for example, an HDD or SSD.

Figure 2:
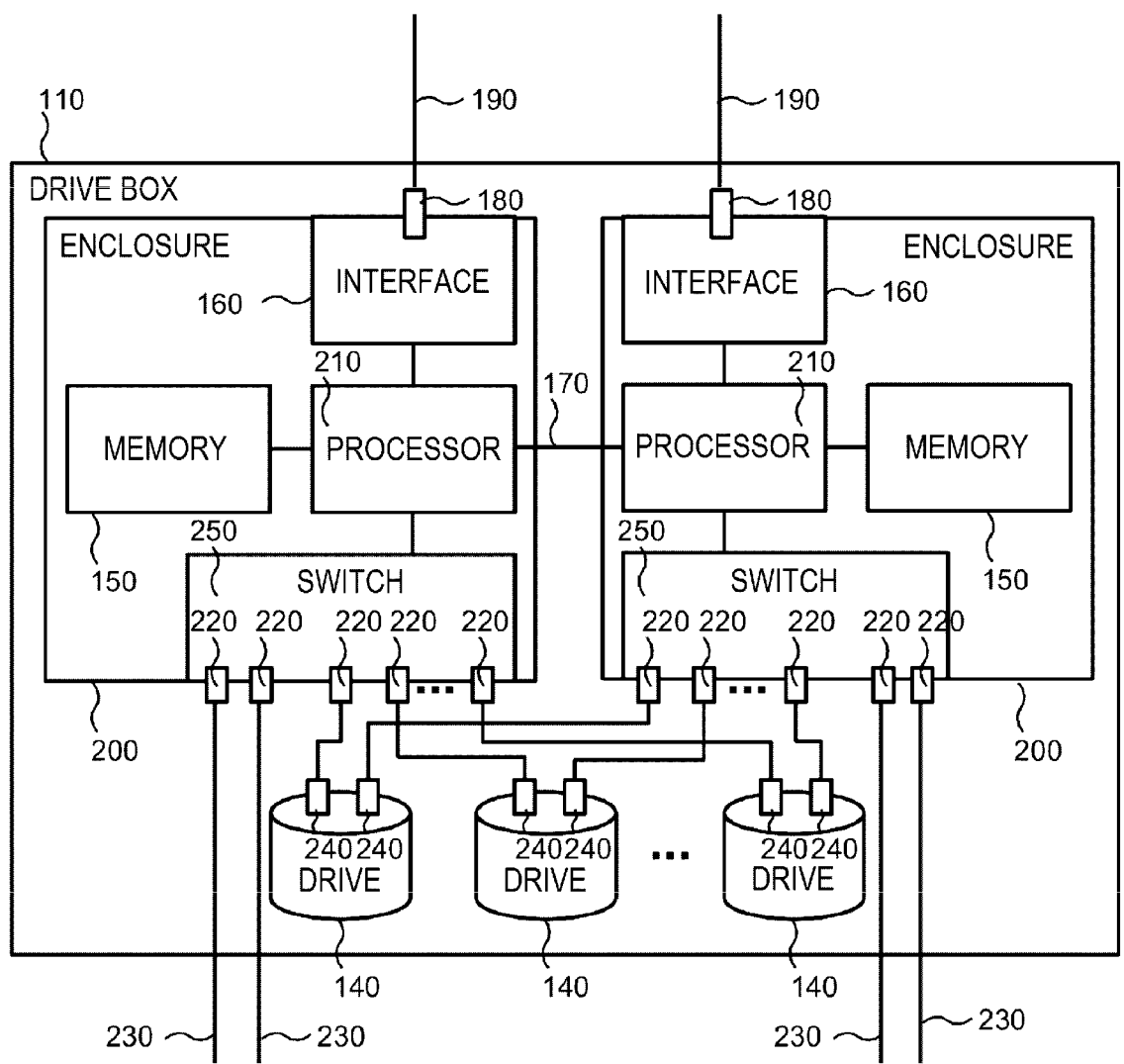
FIG. 2 is a block diagram showing a configuration example of a drive box according to the first embodiment.

FIG. 2 shows a configuration example of the drive box according to the first embodiment.

The drive box 110 includes redundant enclosures 200, and is mounted with one or the plurality of drives 140.

Each of the enclosures 200 includes an interface 160, a processor 210, a memory 150, and a switch 250, and serves as a control unit that processes commands from the host computer 100 and performs data transfer control between the enclosure 200 itself and the drive 140.

The interface 160 includes a front port 180 and is connected to the network 130 connected to the host computer 100 or another drive box via a front path 190. The interface 160 is connected to the processor 210 and communicates commands, data, and the like with the host computer 100 or another drive box 110.

The processor 210 is connected to the interface 160, the memory 150, and the switch 250, and is connected to an enclosure path 170 leading to another processor 210 for redundancy. The processor 210, for example, processes commands and data with the host computer 100, another drive box, and the storage controller 120, and controls the drive box 110 and the drives 140. Further, a part of the functions of the storage controller 120 may be offloaded and processed.

The memory 150 is configured with, for example, a semiconductor memory such as a synchronous dynamic random access memory (SDRAM), and may be configured in combination with a non-volatile memory such as a storage class memory (SCM). As a main memory of the processor 210, an execution program (such as a control program of the drive box 110) and a management table referred to by the processor are stored. The memory 150 is also used as a buffer memory and a cache memory for data transfer.

The switch 250 is, for example, a PCI Express switch, which is connected to the processor 210, and is connected to drive ports 240 of the drive 140 via switch ports 220. The switch is connected to one or the plurality of drives 140. For redundancy, the drive 140 may be connected to the switches 250 of the plurality of enclosures 200. Further, the switches 250 may be connected to the storage controller 120 via the switch ports 220 and via backend paths 230. At this time, for redundancy, one of the switches 250 may be connected to a plurality of storage controllers 120 via a plurality of backend paths 230.

The drives 140 are mounted on one or the plurality of drive boxes 110 and each include, for example, a plurality of drive ports 240 for redundancy, and are connected to the switches 250 in the plurality of enclosures 200.

Figure 3:
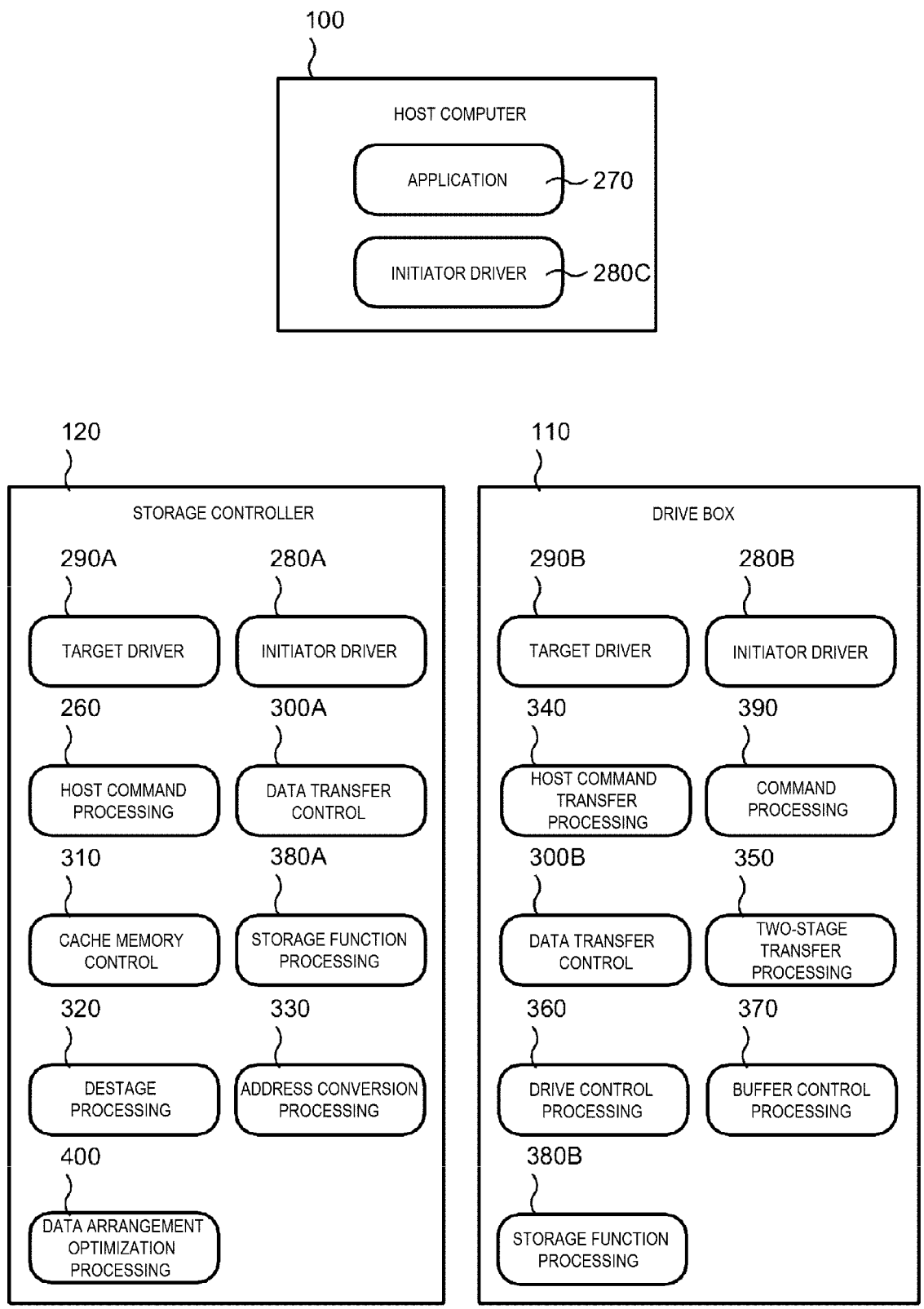
FIG. 3 is a block diagram showing a program configuration example of a host computer, a storage controller, and a drive box according to the first embodiment.

FIG. 3 is a block diagram showing a program configuration example of the host computer, the storage controller, and the drive box of the information system according to the first embodiment.

For example, in the host computer 100 or the storage controller 120, the program is stored in a memory, and various kinds of processing are executed by being executed by the CPU core of the CPU. In addition, in the drive box 110, the program is stored in the memory 150, and various kinds of processing are executed by being executed by the processor 210. The program may be executed by using hardware such as a GPU, an ASIC, or an FPGA instead of the CPU or the processor 210, and the processing of the program may be processed by dedicated hardware. In the following description, for ease of understanding, description will be given assuming that such a program is executed by the CPU or the processor 210.

The host computer 100 has a program including an application 270 and an initiator driver 280. Here, a main program is given as an example, and other programs such as an operation system (OS) are omitted.

The application 270 is, for example, a program such as a numerical calculation program, a database, and a Web service, and is assumed to have various uses such as an accounting system and an analysis system.

The initiator driver 280C recognizes a target driver 290 that operates as a peripheral device such as a disk, and provides an interface of commands such as read and write to the application 270. For example, the initiator driver 280C of the host computer 100 recognizes a storage region provided by a target driver 290A of the storage controller 120 or a target driver 290B of the drive box 110. If the storage controller 120 operates as an initiator of the NVMe-oF for the host computer 100, the initiator driver 280C may be a driver that supports the NVMe-oF.

The storage controller 120 includes programs such as the target driver 290A, an initiator driver 280A, a host command processing 260, a data transfer control 300A, a cache memory control 310, a storage function processing 380A, a destage processing 320, an address conversion processing 330, and a data arrangement optimization processing 400, and is configured with an OS (not shown), similarly to the host computer 100.

The target driver 290A of the storage controller 120 provides a storage region to an initiator driver 280B of the drive box 110 and the initiator driver 280C of the host computer 100, and receives a command and transmits a command completion response. For example, when the configuration in FIG. 1 is adopted, in response to a request from the initiator driver 280C of the host computer 100, the target driver 290B of the drive box 110 receives the request, a host command transfer processing 340 of the drive box 110 transfers a command, and the target driver 290A of the storage controller 120 receives the command via the initiator driver 280B of the drive box 110.

The initiator driver 280A of the storage controller 120 transmits a controller command to the target driver 290B of the drive box 110. The drive box 110 may provide the storage region to the storage controller 120. Here, the controller command indicates a command issued from the storage controller 120.

The host command processing 260 of the storage controller 120 receives a command issued by the host computer 100 via the target driver 290A, performs command analysis, command processing (a read command, a write command, and a management command), creation of a command completion response, transmission of the command completion response via the target driver 290A, and the like.

In accordance with an instruction from the host command processing 260, the data transfer control 300A of the storage controller 120, for example, instructs the drive box 110 to perform data transfer processing between the drive box 110 and the host computer 100. When data transfer between the plurality of drive boxes 110 is necessary, the data transfer processing is also instructed.

The cache memory control 310 of the storage controller 120 determines cache hit or hit miss based on cache data search, transitions between dirty data (a state before write to a physical drive) and clean data (a state after write to the physical drive), and controls reserve and release of a cache region. The determination of cache hit or hit miss determines whether or not data in response to the command from the host computer 100 is in the memory of the storage controller 120. For example, when the command from the host computer 100 is a write command, it is determined whether or not the data in response to the write command exists in the memory. For the data, the memory of the storage controller 120 may be used, or the memory 150 of the drive box 110 may be used. The same applies to a read command. Each processing of the cache memory control is a widely known technique, and a detailed description thereof will be omitted here.

The storage function processing 380A of the storage controller 120 creates a command (an offload command) for offloading storage functions to the drive box 110, and instructs the drive box 110. For example, the storage functions to be offloaded include various functions such as compression, decompression, encryption, decryption, copy and format, RAID calculation, and parity calculation. In accordance with the data transfer control 300A, a part or a plurality of storage function processing 380A are implemented in the drive box 110.

The destage processing 320 of the storage controller 120 performs the destage processing 320 of writing data in the cache to the drive 140 via the initiator driver 280A.

The address conversion processing 330 of the storage controller 120 has a data range of a name space (NS) managed by the storage controller 120 and a mapping table of the drive box 110 and the drive 140 where data is stored, and converts an address of the data range to an address of a storage region in the corresponding drive box 110 and drive 140.

The data arrangement optimization processing 400 of the storage controller 120 determines whether or not the drive box 110 storing the data for which a data transfer request has been received is optimal from meta information or the like held by the storage controller 120, and issues a data movement instruction to the drive box 110 when there is a need for data movement. For example, when two-stage transfer is performed, an access frequency is determined as a determination element for data arrangement optimization. If the access frequency is high, data is instructed to move from the drive box 110 of a two-stage transfer source to the drive box 110 of a two-stage transfer destination. Here, the two-stage transfer refers to an operation in which a command from the host computer 100 is received, and the drive box 110 receiving an instruction from the storage controller 120 transfers the command to another drive box 110. When the command is a write command, the write data is transferred to another drive box, and when the command is a read command, the data is received from another drive box.

When the data is read on the drive box 110 asynchronously at a timing other than a data access of the host computer 100, for example, at the time of capacity rebalancing, reclamation, garbage collection, and backup processing such as snapshot, the data arrangement optimization processing 400 is performed, and the data is moved to the optimal drive box 110.

The drive box 110 includes the target driver 290B, the initiator driver 280B, the host command transfer processing 340, a command processing 390, a data transfer control 300B, a two-stage transfer processing 350, a storage function processing 380B, a drive control processing 360, a buffer control processing 370, and an OS (not shown).

The target driver 290B of the drive box 110 provides a storage region to the initiator driver 280C of the host computer 100 and the initiator driver 280A of the storage controller 120, and receives a command and transmits a command completion response. The same function is also provided to an initiator driver of another drive box.

For example, when the configuration in FIG. 1 is adopted, in response to a request from the initiator driver 280C of the host computer 100, the target driver 290B of the drive box 110 receives the request, the host command transfer processing 340 of the drive box 110 performs the transfer processing, and the target driver 290A of the storage controller 120 receives the command via the initiator driver 280B of the drive box 110.

The target driver 290B of the drive box 110 provides a storage region to the initiator driver 280A, the initiator driver 280C, and the initiator driver of another drive box. In addition, the target driver 290B performs command reception and command completion response transmission between the target driver 290B itself and the host computer 100. In addition, command receiving and command completion response transmitting are performed between the storage controller 120. Further, the target driver 290B performs command reception and command completion response transmission between the target driver 290B itself and another drive box. Transfer between the above devices also includes data transfer. For example, data transfer is performed using DMA or RDMA.

The initiator driver 280B of the drive box 110 transmits a command and receives a command completion response to the target driver 290A of the storage controller 120 and the target driver of another drive box.

The host command transfer processing 340 of the drive box 110 receives the command issued by the host computer 100 using the target driver 290B, analyzes the command, and transfers the command to the storage controller 120. At the time of the command transfer, the command is exchanged with the target driver 290A of the storage controller 120 via the initiator driver 280B. When the command is analyzed, in a case where an access is related to an address range set in advance from the storage controller 120, for example, in a case where it is a storage region provided by the drive of the drive box 110 that has received the command from the host computer 100, the command processing 390 may be started without intervention of the storage controller 120 to directly transfer the data from the drive box 110 to the host computer 100. At this time, the command processing 390 creates read and write processing and a command completion response, and transmits the command completion response to the initiator driver 280C via the target driver 290B.

The command processing 390 of the drive box 110 receives a result of the host command processing 260 of the storage controller 120, and starts, for example, the data transfer control 300B.

The data transfer control 300B of the drive box 110 receives an instruction from the command processing 390 of the drive box 110 receiving an instruction from the storage controller 120, and performs data transfer processing between the drive box 110 and the host computer 100. At this time, upon receiving the result of the host command processing 260 of the storage controller 120, the instruction is output to the command processing 390 of the drive box 110. Also, when there is a direct transfer instruction from the host command transfer processing 340, data transfer processing between the drive box 110 and the host computer 100 is performed. For example, the data transfer is performed in accordance with a protocol such as the NVMe-oF.

The two-stage transfer processing 350 of the drive box 110 receives the result of the host command processing 260 of the storage controller 120, and, when the data transfer between the plurality of drive boxes 110 is necessary, transfers the data from another drive box to the drive box 110. For the transfer, a buffer region is secured in the memory 150 of the drive box 110, and data transfer is performed using the buffer region. For example, the data transfer is performed by the NVMe-oF using a method such as DMA, RDMA, frame transfer, or packet transfer. The data transferred to the drive box 110 after performing the two-stage transfer processing 350 is transferred to the host computer 100.

The drive control processing 360 of the drive box 110 performs data transfer processing such as read and write to the drive 140 in accordance with the management of the drive 140 in the drive box 110 and the instruction of the command processing 390. In addition, the management of the drive 140 is also performed by using a management command or the like.

The buffer control processing 370 of the drive box 110 secures and releases a buffer which is a temporary memory region for performing the data transfer.

The storage function processing 380B of the drive box 110 performs the storage function in response to a request from the storage controller 120. For example, the storage processing to be offloaded includes various kinds of processing such as compression, decompression, encryption, decryption, copy and format, RAID calculation, and parity calculation. A part or the plurality of storage function processing 380A are performed in the storage function processing 380B of the drive box 110 by the command processing 390.

Figure 4:
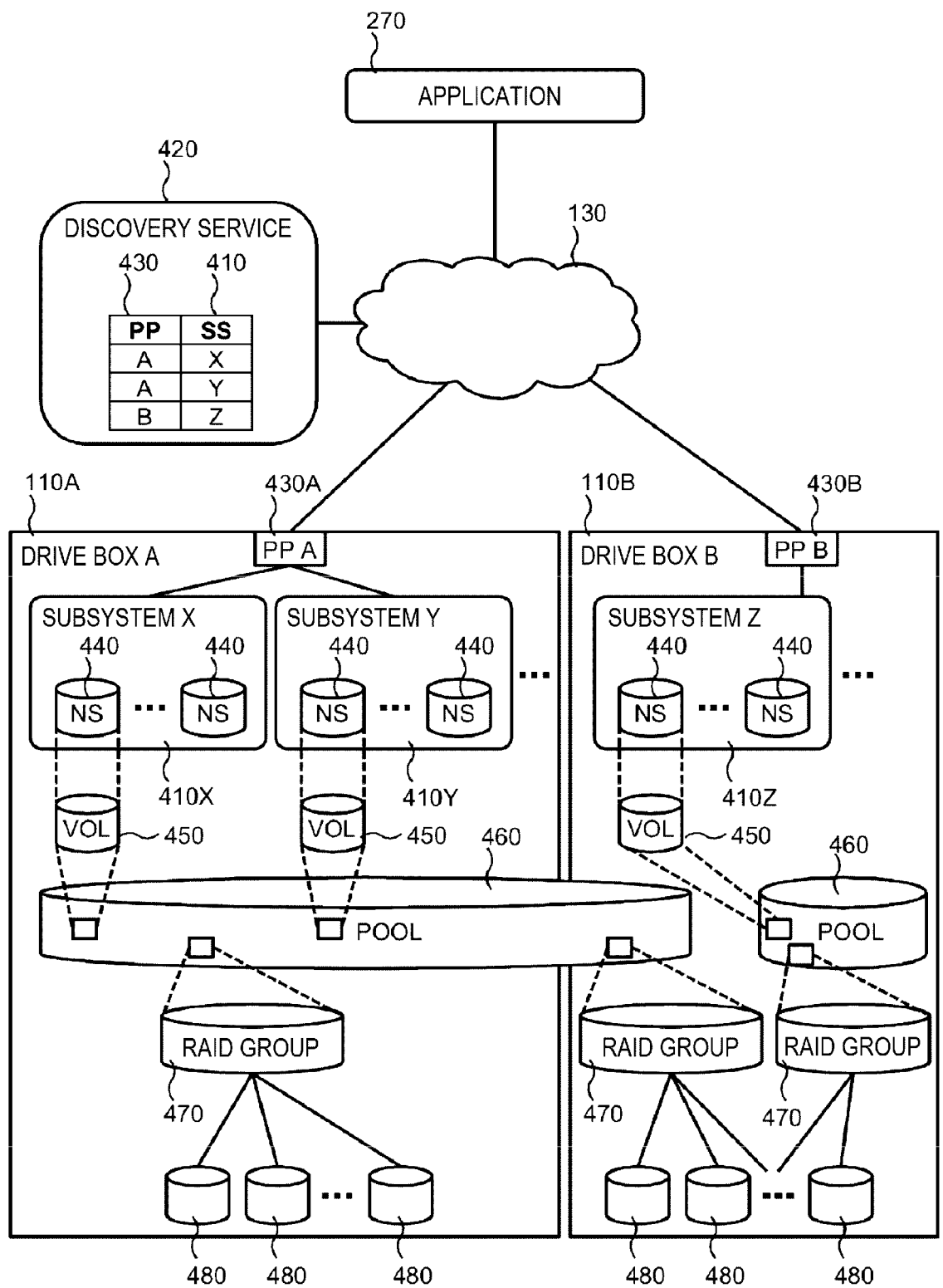
FIG. 4 is a block diagram showing a logical structure of the information system and a data structure example according to the first embodiment.

FIG. 4 is a block diagram showing a logical structure of the information system and a data structure example according to the first embodiment.

A logical structure of the information system according to the first embodiment includes, for example, the application 270, the network 130, a discovery service 420, and the drive box 110. Particularly, the drive box 110 includes a physical port 430 connected to the network 130, subsystems 410, NSs 440, VOLs 450, a POOL 460, a RAID group 470, a PDEV 480, and the like.

The application 270 uses the storage system configured with the storage controller 120 and the drive box 110 for storing data. The application 270 writes and reads data to and from a volume provided by the storage system. For example, assuming that NVMe is used here, the NS 440 corresponds to the volume used by the application 270. For example, in a case of SCSI, a logical unit (LU) corresponds to the NS 440.

The discovery service 420 provides a service for associating the application 270 with the NS 440. For example, the discovery service holds a correspondence table between the physical port 430 and the subsystem 410. In order for the application 270 to associate with the NS 440 and access the NS 440, by first accessing the discovery service 420, acquiring an identifier of the physical port 430 corresponding to the subsystem 410 in which the NS 440 is defined, and accessing the physical port 430, the target NS 440 belonging to the subsystem 410 can be accessed. The discovery service 420 may be defined in the host computer 100, may be defined in the storage controller 120, or may be defined in the drive box 110.

The drive box 110 includes one or a plurality of PDEVs 480. The PDEV 480 is assumed to be the drive 140 such as an HDD or an SSD, but may be a logical device (DEV). The RAID group 470 is created from one or the plurality of PDEVs 480. The RAID group 470 indicates that data is protected. For example, the data may be duplicated or tripled, and indicates overall redundancy. A configuration in which the PDEV 480 is directly used without the RAID group 470 may be used. The POOL 460 is configured with one or the plurality of RAID groups 470 or directly from the PDEV 480. The POOL 460 may be thin provisioning (TP) or may be defined with a virtual capacity that is greater than a physical capacity. From the POOL 460, the VOLs 450 are cut out and registered as the NS 440 in the subsystem 410. Here, the VOLs 450 may be virtual volume (VVOL) or real volume (RVOL). The VVOL may be defined by a virtual capacity greater than a physical capacity.

The POOL 460 may extend over the plurality of drive boxes 110 such as the drive box 110A and the drive box 110B. For example, in a case of a TP pool 460, a capacity of the POOL 460 is designed to be greater than a capacity of the PDEV 480 mounted in the drive box 110A, and when a physical free capacity of the POOL 460 decreases, the capacity is expanded by adding the PDEV 480 to the drive box 110A. When the number of the PDEVs 480 that can be mounted in the drive box 110A is exceeded, the drive box 110B is newly added, and the PDEVs 480 of the drive box 110B or the RAID group 470 configured with one or the plurality of PDEVs 480 is added to the POOL 460, so that the capacity is expanded. The NSs 440 of a subsystem 410Z of the drive box 110B may be added to the POOL 460 of the drive box 110A. For example, in this case, the NSs 440 of the subsystem 410Z are used by being shown to the storage controller 120 and the drive box 110A without directly being shown to the application 270.

The drive box 110 may include a plurality of physical ports 430, and the plurality of physical ports 430 may be associated with one subsystem 410. At this time, a server coordinates resource contention.

Figure 5:
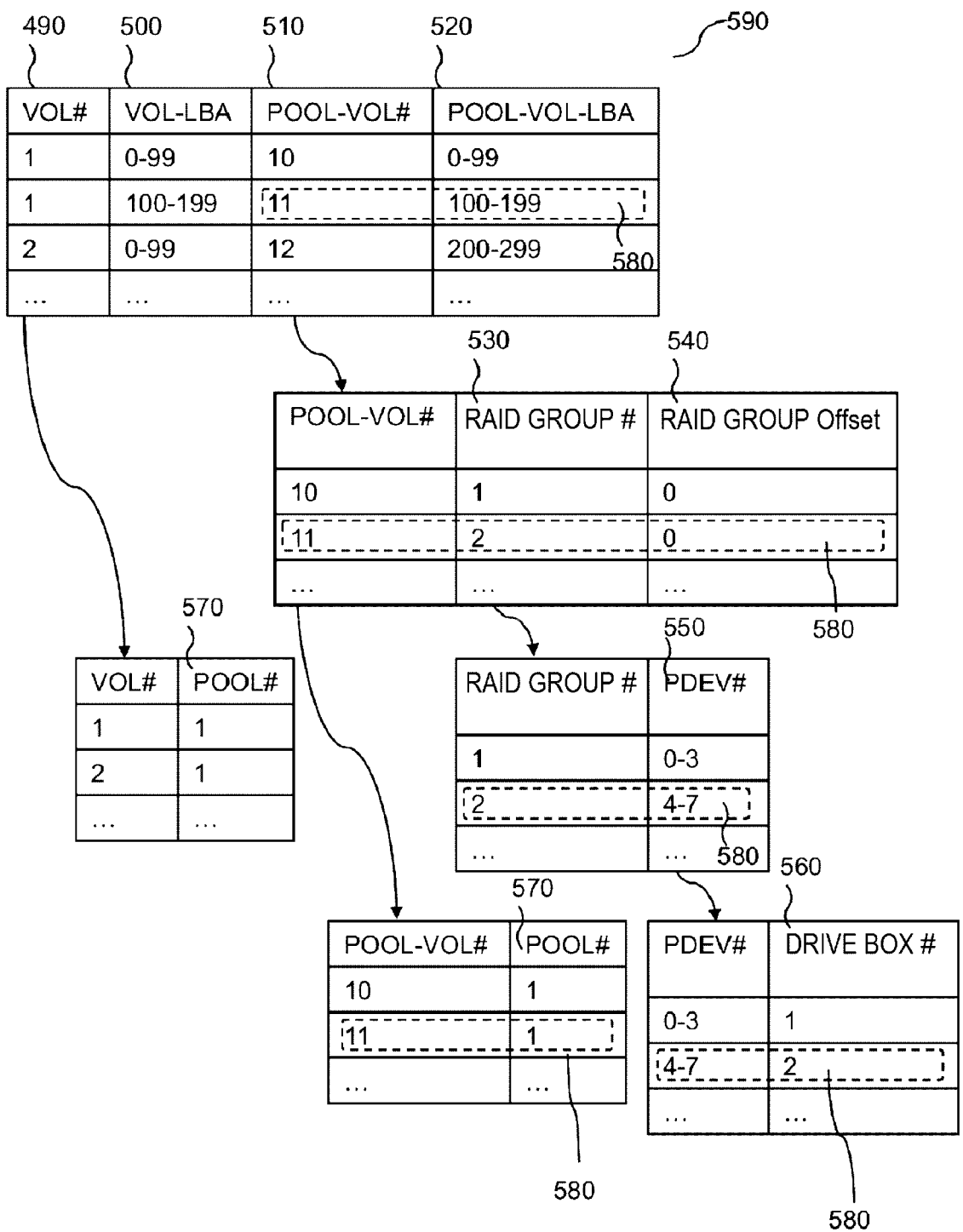
FIG. 5 is a diagram showing an example of an address management table according to the first embodiment.

FIG. 5 is a diagram showing an example of an address management table according to the first embodiment.

An address management table 590 is stored in the memory of the storage controller 120, and is referred to by various programs of the storage controller 120 such as the address conversion processing 330. The address management table 590 includes a VOL number 490, a VOL-LBA 500, a POOL-VOL number 510, and a POOL-VOL-LBA 520. Correspondence between the VOL number 490 and a POOL number 570, between the POOL-VOL number 510 and the POOL number 570, between the POOL-VOL number 510, a RAID group number 530, and a RAID group Offset 540, between the RAID group number 530 and a PDEV number 550, between the PDEV number 550 and a drive box number 560, and the like is managed.

The address management table 590 shown here is an example. For example, the VOL may be a virtual VOL, and other information such as compression and deduplication-related information, POOL attributes, information indicating a RAID type of the RAID group, and a VOL capacity may be added. The address management table 590 manages correspondence between logical addresses (logical storage regions) of NS, VOL, and the like provided to the application, and the drive boxes 110 in which data is actually stored and physical addresses (physical storage regions) in the drive.

The VOL number 490 is associated with, for example, a Namespace ID (NSID) or a Logical Unit Number (LUN) according to an access protocol to the storage.

The address management table 590 is used to specify the drive of an access destination with respect to an access from the application to the VOL number 490 and the VOL-LBA 500.

The VOL number 490 and the POOL-VOL number 510 are cut out from the POOL number 570. The POOL-VOL number 510 includes the RAID group number 530 and the RAID group Offset 540. The RAID group number 530 includes the plurality of PDEV numbers 550 (physical devices), and the PDEV number 550 belongs to the drive box number 560. The PDEV number 550 may extend over a plurality of drive box numbers 560. In this case, the RAID group number 530 includes the plurality of drive box numbers 560.

In the example in FIG. 5, when the VOL number 490 is "1" and the VOL-LBA 500 is "0 to 99", the POOL-VOL number 510 corresponds to "10", and the POOL-VOL-LBA 520 corresponds to "0 to 99". The "10" of the POOL-VOL number 510 is configured with the RAID group number 530 of "1" and the RAID group Offset 540 of "0". The "1" of the RAID group number 530 is configured with the PDEV number 550 of "0-3", and the PDEV number 550 of "0-3" is mounted on the drive box number 560 of "1".

The PDEV may be configured with, for example, a flash drive. In the drive, a virtual address and a physical address may be converted such that an address in the PDEV is set as a virtual address and further converted to a physical address.

The drive box addition 580 shows a state in which the POOL capacity is insufficient and a drive box is added for addition of the capacity. The drive box addition 580 is associated with the POOL number 570, the POOL-VOL number 510, the POOL-VOL-LBA 520, the RAID group number 530, the RAID group Offset 540, and the PDEV number 550.

When data is moved between the drive boxes 110 due to the access frequency or the like, the correspondence between the VOL-LBA 500, the POOL-VOL number 510 and the POOL-VOL-LBA 520 is changed.

Although the address management table 590 is managed by the storage controller 120, the entire or apart of the address management table 590 may be cached in the drive box 110, and data transfer upon cache hit may be performed between the application 270 and the drive box 110 using the cache.

Figure 6:
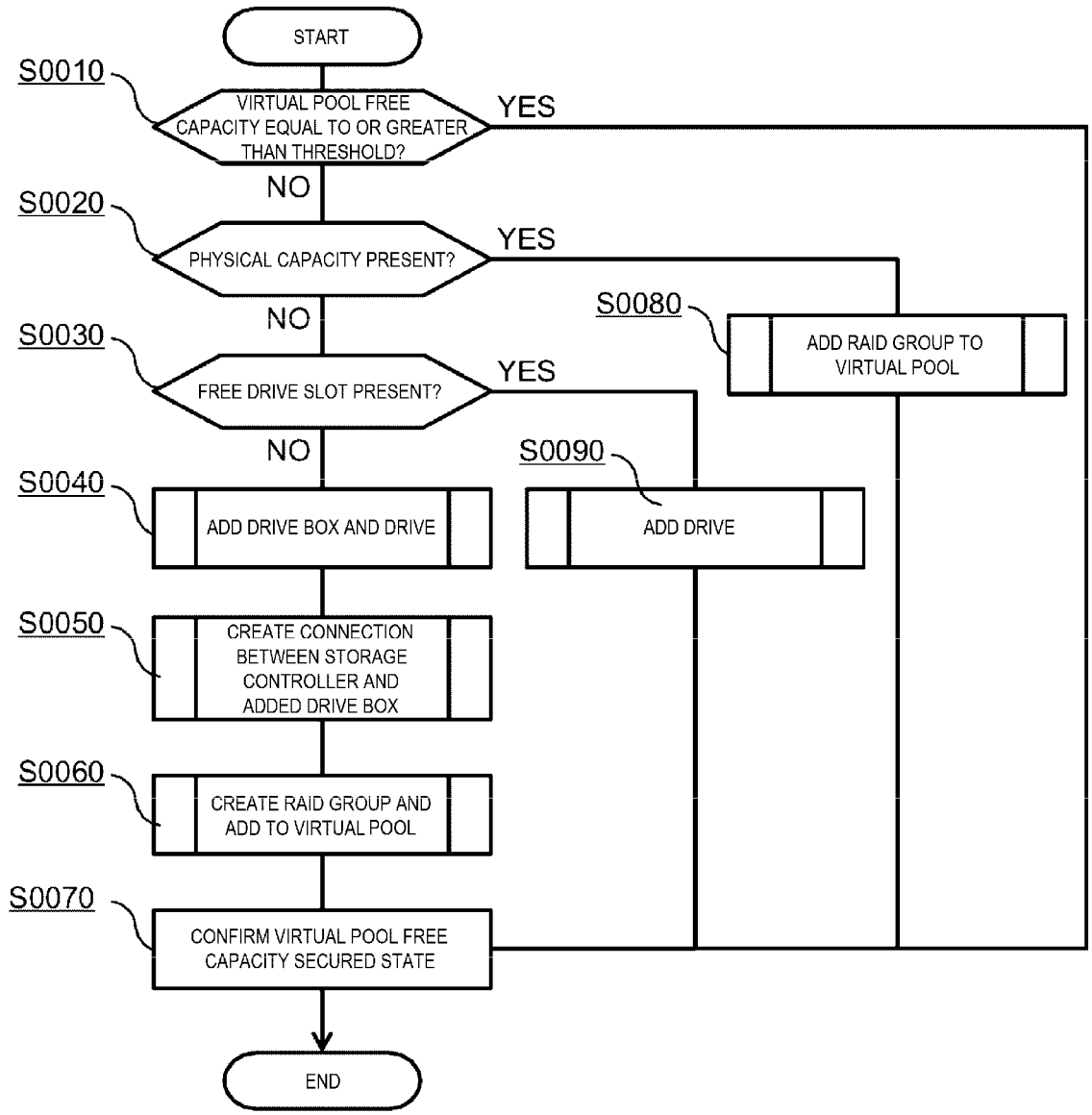
FIG. 6 is a diagram showing a drive box addition flowchart according to the first embodiment.

FIG. 6 shows an example of the drive box addition of the information system according to the first embodiment.

In step S0010, as a part of the host command processing 260 of the storage controller 120, a virtual pool free capacity is compared with a threshold. When the virtual pool free capacity is equal to or greater than the threshold, the processing ends in step S0070, confirming a virtual pool free capacity secured state. The comparison between the virtual pool free capacity and the threshold determines whether physical resources are insufficient for constituting a logical address such as NS that is provided to the application.

When the free capacity is less than the threshold in step S0010, the processing moves to step S0020 to determine whether a physical capacity that can be added to the drive box 110 is present. As a result of the determination, when a physical capacity is present, in step S0080, for example, the RAID group 470 is created from the PDEV 480 and added to the POOL 460. When the RAID group 470 is created from the PDEV 480 and added to the POOL 460, contents in the address management table are also updated. However, the VOL number 490 and the VOL-LBA 500 for the application 270 of the host computer 100 to access the data are not changed. Therefore, the host computer 100 is not aware of the increase in the physical capacity in step S0080, and does not need to change the setting of the host computer 100. In step S0070, the virtual pool free capacity secured state is confirmed and the processing ends.

In step S0030, it is determined whether or not the drive 140 can be added to the drive box 110. Therefore, it is determined whether a free slot for storing the drive is present. When a drive slot is free, the drive 140 is added in step S0090. When the drive 140 is added, the contents in the address management table are also updated. However, an address space such as the VOL number 490 for the application 270 of the host computer 100 to access the data is not changed. In step S0070, the virtual pool free capacity secured state is confirmed and the processing ends.

When it is determined in step S0030 that no free drive slot is present, the processing moves to step S0040 and the drive box 110 and the drive 140 are added. Then, in step S0050, a connection is created in order to establish a connection between the storage controller 120 and the added drive box 110. Next, in step S0060, for example, the RAID group 470 is created from the PDEV 480 in the added drive box and added to the POOL 460. When the drive box 110 is added, the contents in the address management table are also updated. However, the address space such as the VOL number 490 for the application 270 of the host computer 100 to access the data is not changed. In step S0070, the virtual pool free capacity secured state is confirmed and the processing ends. In step S0070, a part of the address management table 590 is updated with respect to a storage region (a logical storage region) such as the NS provided to the host computer 100 by the drive box 110. For example, the drive box addition 580 is added. Accordingly, the address management table is updated so that the capacity of the expanded physical storage region (the physical storage region) can be associated with the logical storage region.

In step S0070, the confirmation of the virtual pool free capacity secured state may include associating the capacity of the expanded physical storage region with the logical address such as the NS provided to the application.

According to the flow, for example, even when the physical capacity is insufficient in the TP pool and no free space is present for mounting the drive 140, by adding the drive box 110, the physical capacity of the POOL 460 is secured without changing the setting of the host computer 100.

Figure 7:
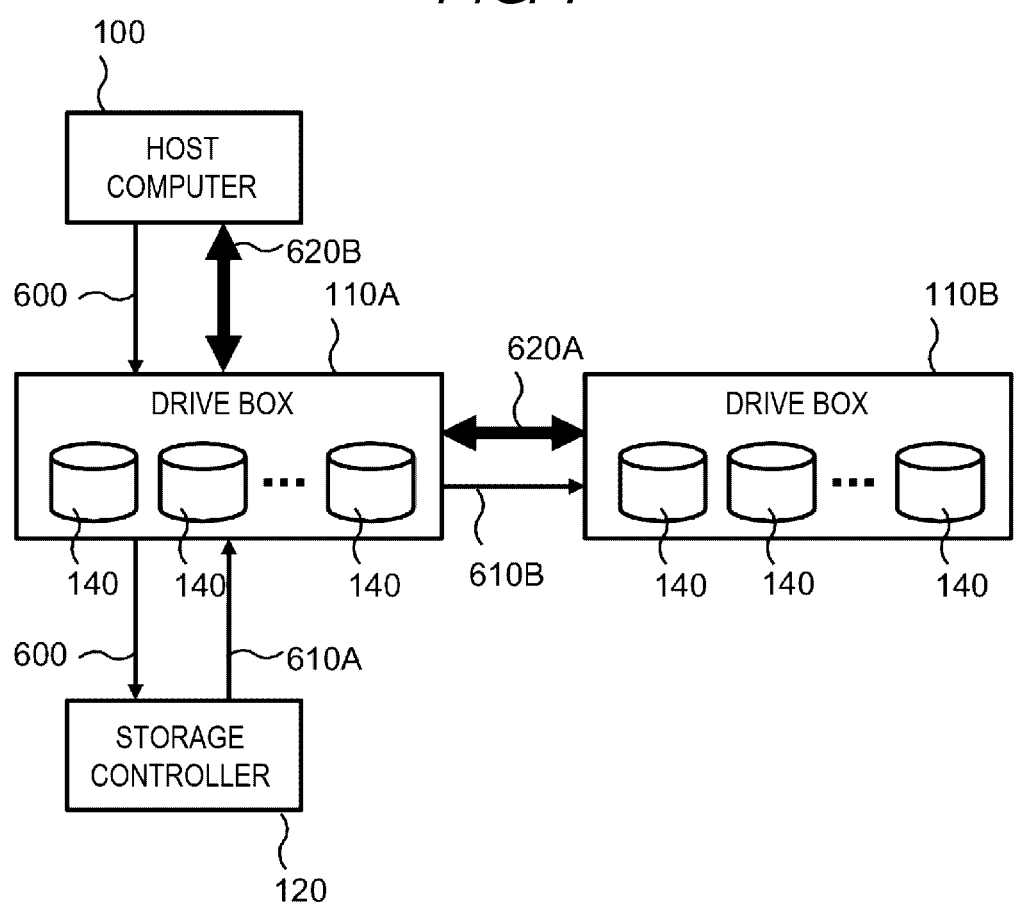
FIG. 7 is a diagram showing an outline of a method of executing a host command according to the first embodiment.

FIG. 7 is a diagram showing an outline of a method of executing a host command according to the first embodiment.

In the information system, the application 270 of the host computer 100 issues a command 600 to the drive box 110A via the initiator driver 280C. The drive box 110A receives the command 600 with the target driver 290B, and transfers the command 600 to the target driver 290 of the storage controller 120 via the initiator driver 280B with the host command transfer processing 340. The storage controller 120 performs the host command processing 260. The storage controller 120 (for example, the address conversion processing 330) refers to the address management table and determines which drive box 110 includes target data of the command. The data transfer control 300A of the storage controller 120 is started, a data transfer command 610A is transmitted to the drive box 110A that has received the command 600 from the host computer 100, and the data transfer control 300 is started via the command processing 390 of the drive box 110A. The data transfer command 610A includes information on the drive box that stores the target data of the command or that is to be stored, which is obtained by referring to the address management table.

In the first embodiment, the storage controller 120 refers to the address management table, and when the data transfer command 610A includes a two-stage transfer instruction, the drive box 110A starts the two-stage transfer processing 350. As another method, when the data transfer command 610A from the storage controller 120 does not include the two-stage transfer instruction, when the drive box 110 refers to the address management table and determines that the target data of the command 600 is in the drive box 110B, the drive box 110A starts the two-stage transfer processing 350.

Here, in a case of read, a buffer for transfer is prepared in the buffer control processing 370, and a data transfer command 610B is transferred to the drive box 110B. Upon receiving the data transfer command 610B, the command processing 390 of the drive box 110B starts the data transfer control 300, and performs data transfer 620A to the drive box 110A. The drive box 110A transfers the data to the host computer 100 as data transfer 620B.

In a case of write, after the two-stage transfer processing 350 is started in the drive box 110A, the data transfer command 610B is transferred to the drive box 110B, which is received by the command processing 390 of the drive box 110B, the data transfer control 300 is started, and the data transferred from the data transfer 620B to the drive box 110A is transferred to the drive box 110B via the data transfer 620A. The drive box 110B starts the drive control processing 360 and stores the data in the drive 140.

Accordingly, the data transfer is directly performed between the host computer 100 and the drive box 110 without transferring the data to the storage controller 120. Further, by performing the data transfer between the drive box 110A and the drive box 110B via the two-stage transfer processing 350, for example, when capacity virtualization such as TP is performed, even if the physical capacity cannot be added to the drive box 110A, the addition of the drive box 110B enables the capacity addition without affecting the application 270 of the host computer 100.

In addition, since data is transferred between the host computer 100 and the drive box 110, broadband performance of the drive box 110 such as FBOF and latency reduction (response performance improvement) can be expected without being affected by the bandwidth of the storage controller 120.

Figure 8:
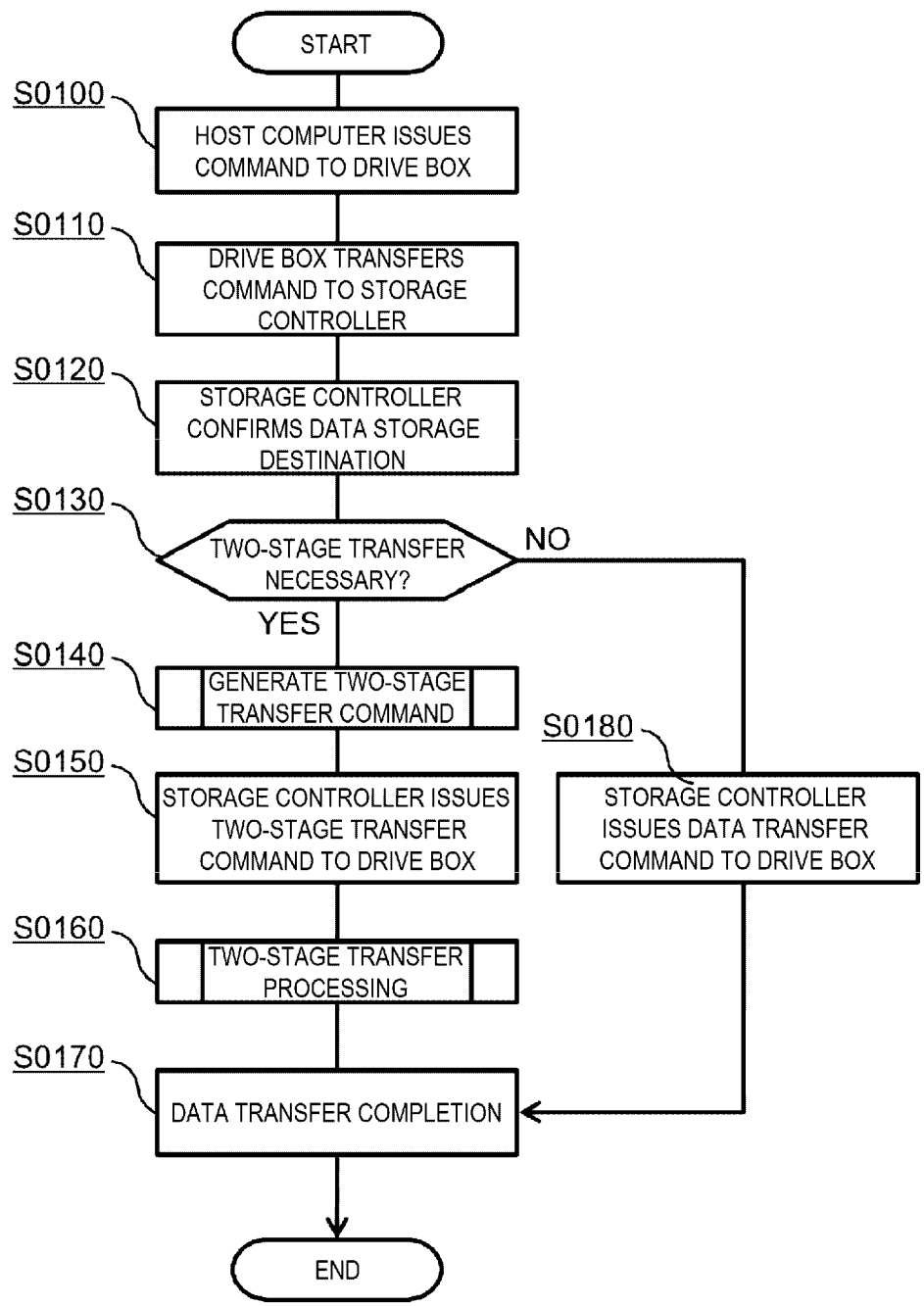
FIG. 8 is a diagram showing a drive box selection flowchart according to a data arrangement determination method according to the first embodiment.

FIG. 8 shows a drive box selection example by the data transfer control 300A of the information system according to the first embodiment.

In step S0100, the host computer 100 issues the command 600 to the drive box 110. In step S0110, the drive box 110 transfers the command 600 to the storage controller 120. In step S0120, the storage controller 120 (such as the address conversion processing 330) confirms a data storage address based on the address management table. In step S0130, it is determined whether or not the two-stage transfer is necessary based on the data storage address confirmed in step S0120.

When the data storage address is the drive box 110 which is a transmission source of the command 600 and the two-stage transfer is not necessary, in step S0180, the storage controller 120 issues the data transfer command 610A to the drive box 110 and the processing ends in step S0170 as data transfer completion.

When it is determined in step S0130 that the two-stage transfer is necessary, that is, based on the address management table, when the data storage address is another drive box 110 that is not the drive box 110 which is the transmission source of the command 600. In step S0140, the storage controller 120 generates a data transfer command including the two-stage transfer command. In step S0150, the storage controller 120 issues the two-stage transfer data transfer command 610A to the drive box 110. Further, in step S0160, the two-stage transfer processing 350 of the drive box 110 performs the two-stage transfer, and the processing ends in step S0170 as data transfer completion. The data transfer command including the two-stage transfer command includes information of the data storage destination.

According to the flow, for example, even when the physical capacity is insufficient in the TP pool and no free space is present for mounting the drive 140, by adding the drive box 110 and performing the two-stage transfer, the data transfer is handled while the physical capacity of the POOL 460 is secured without changing the setting of the host computer 100.

Figure 9:
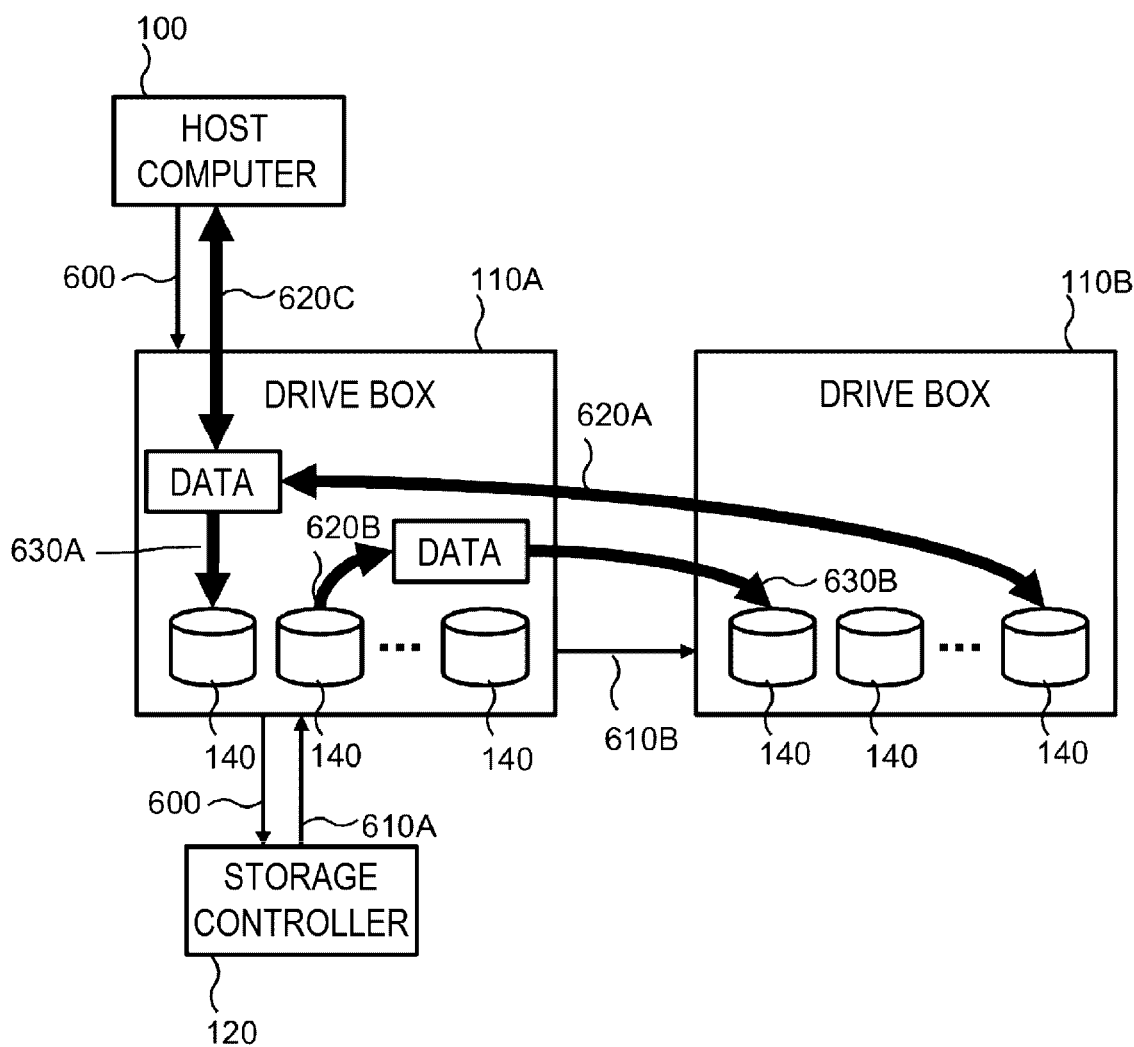
FIG. 9 is a diagram showing an outline of the method of executing the host command according to the first embodiment.

FIG. 9 is a diagram showing an outline of a method of executing the host command according to the first embodiment.

In the information system, the application 270 of the host computer 100 issues the command 600 to the drive box 110A via the initiator driver 280C. The drive box 110A receives the command 600 with the target driver 290B, and transfers the command 600 to the target driver 290A of the storage controller 120 via the initiator driver 280B with the host command transfer processing 340. The storage controller 120 performs the host command processing 260, starts the data transfer control 300A, transmits the data transfer command 610A to the drive box 110A, and starts the data transfer control 300 via the command processing 390 of the drive box 110A. In the above processing, when the drive box 110A refers to the address management table and determines that the target data is the drive box 110B, the drive box 110A may start the two-stage transfer processing 350.

Here, in a case of read, a buffer for transfer is prepared in the buffer control processing 370, and the data transfer command 610B is transferred to the drive box 110B. Upon receiving the data transfer command 610B, the command processing 390 of the drive box 110B starts the data transfer control 300, performs the data transfer 620A to the drive box 110A, and the drive box 110A transfers the data to the host computer 100 by data transfer 620C.

At this time, in the data arrangement optimization processing 400 of the storage controller 120, it is determined whether or not the drive box 110B where the data for which the data transfer request is stored is an optimal position, and when there is a need for data movement, a data movement instruction is issued to the drive box 110A. For example, when the two-stage transfer is performed, an access frequency is determined as a determination element for data arrangement optimization. If the access frequency is high, data is instructed to move from the drive box 110B which is a two-stage transfer destination source to the drive box 110A which is the two-stage transfer destination. The drive box 110A receiving the data movement instruction moves the data from the drive box 110B to the drive box 110A by the data transfer 620A, stores the data in the buffer region on the memory 150 of the drive box 110, and then performs data storage 630A together with the data transfer 620C to the host computer 100. Accordingly, optimal arrangement of data is performed with a minimum number of transfer.

In the case of write, for example, in the data arrangement optimization processing 400 of the storage controller 120, it is determined whether or not the drive box 110B where the data for which the data transfer request is stored is an optimal position. When there is a need for data movement, a data movement instruction is issued to the drive box 110A. Therefore, in this case, the data is stored in the drive box 110A as the data storage 630A. On the other hand, in the data arrangement optimization processing 400 of the storage controller 120, it is determined whether or not the drive box 110B where the data for which the data transfer request is stored is an optimal position, and when there is no need for data movement, the data is transferred and stored in the drive box 110B by the data transfer 620A.

When the data is read on the drive box 110 asynchronously at a timing other than the data access of the host computer 100, for example, at the time of capacity rebalancing, reclamation, garbage collection, and backup processing such as snapshot, the data arrangement optimization processing 400 of the storage controller 120 is performed. For example, when it is more optimal to store the data in the drive box 110B when processing is performed on the data of the drive box 110A, the data transfer 620B is performed in the buffer region on the memory 150 of the drive box 110A, and the data storage 630B is performed in the drive box 110B.

Accordingly, the optimal data arrangement can be performed while minimizing the load of the command 600 and the data transfer between the drive box 110A, the drive box 110B, and the storage controller 120. When the data is moved between the drive boxes, the contents in the address management table are updated. For example, the correspondence between the VOL number 490 and the POOL-VOL number 510 is updated.

Figure 10:
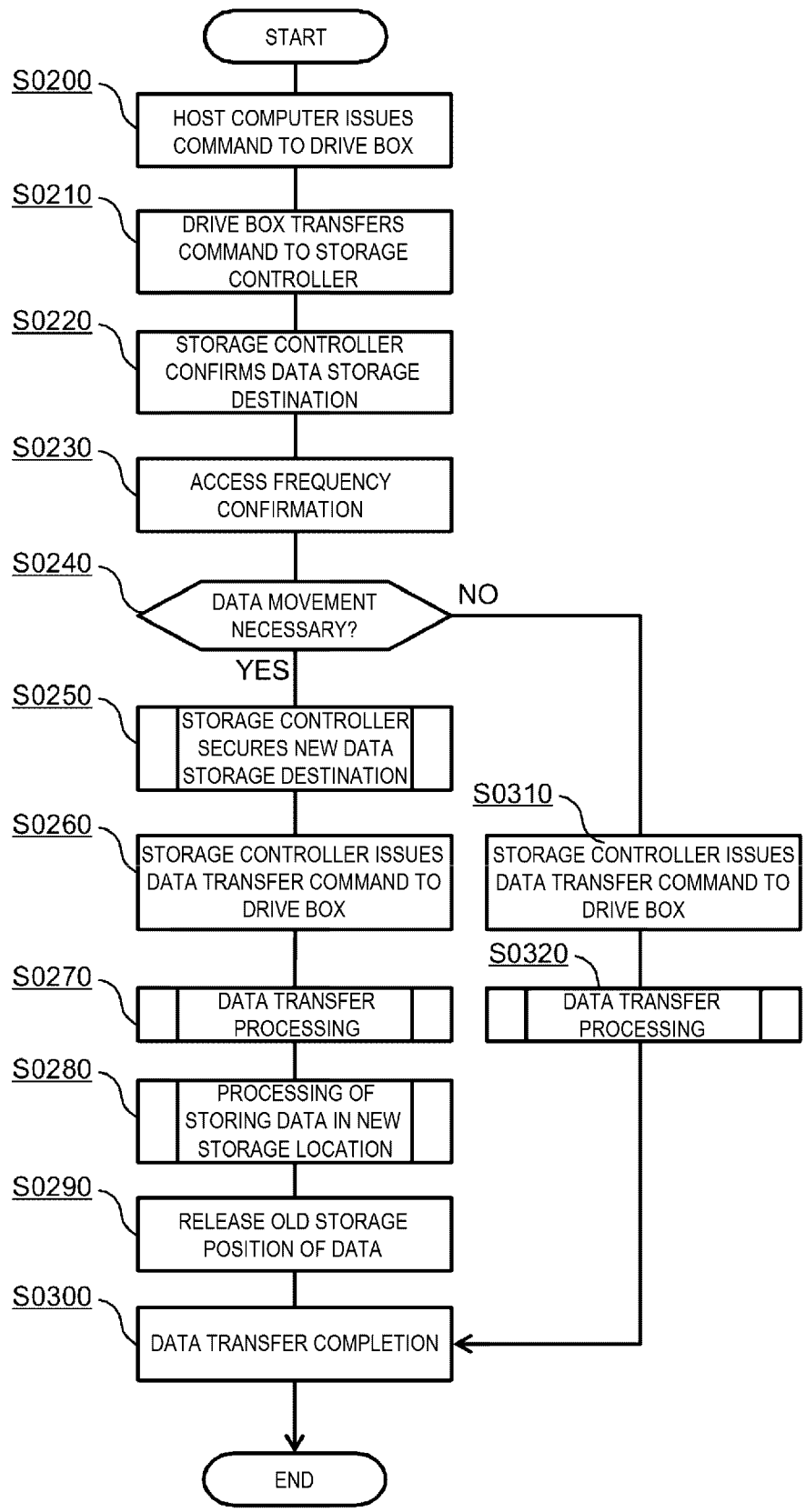
FIG. 10 is a diagram showing a data movement processing flowchart according to the first embodiment.

FIG. 10 shows a data movement processing example of the information system according to the first embodiment.

In step S0200, the application 270 of the host computer 100 issues the command 600 to the drive box 110A via the initiator driver 280C.

In step S0210, the target driver 290B of the drive box 110A receives the command 600 and transfers the command 600 from the host command transfer processing 340 to the storage controller 120 via the initiator driver 280B.

In step S0220, the storage controller 120 receives the command 600 via the target driver 290A and processes the command 600 in the host command processing 260. At this time, the storage controller 120 refers to the address management table and confirms a data storage destination.

In step S0230, the data arrangement optimization processing 400 of the storage controller 120, for example, confirms an access frequency, and determines whether or not data movement is necessary in step S0240. That is, an optimal data storage position is determined. If the data movement is not necessary as a result of the determination, in step S0310, the storage controller 120 issues the data transfer command 610A to the drive box 110A via the data transfer control 300.

Then, in step S0320, the drive box 110A performs the command processing 390, performs the data transfer 620C with the data transfer control 300B, and the processing ends in step S0300 as data transfer completion.

On the other hand, in step S0240, when it is determined that the data movement is necessary, the storage controller 120 secures a new data storage destination in step S0250. Next, in step S0260, the storage controller 120 issues the data transfer command 610A to the drive box 110A via the data transfer control 300. Next, in step S0270, the drive box 110A starts the data transfer control 300 or the two-stage transfer processing 350, and performs the data transfer processing. Next, in step S0280, the drive box 110A stores the data in the new data storage location. Next, in step S0290, in order for the drive box 110A to release an old storage position of data, for example, a notification of data movement completion is sent to the storage controller 120, and the storage controller 120 releases the old data storage position, for example, the old data storage position of the drive box 110B, and the processing ends in step S0300 as the data transfer completion.

According to the above flow, for example, the optimal data arrangement can be performed while minimizing the load of the command 600 and the data transfer between the drive box 110A, the drive box 110B, and the storage controller 120.

Figures 11, 12:
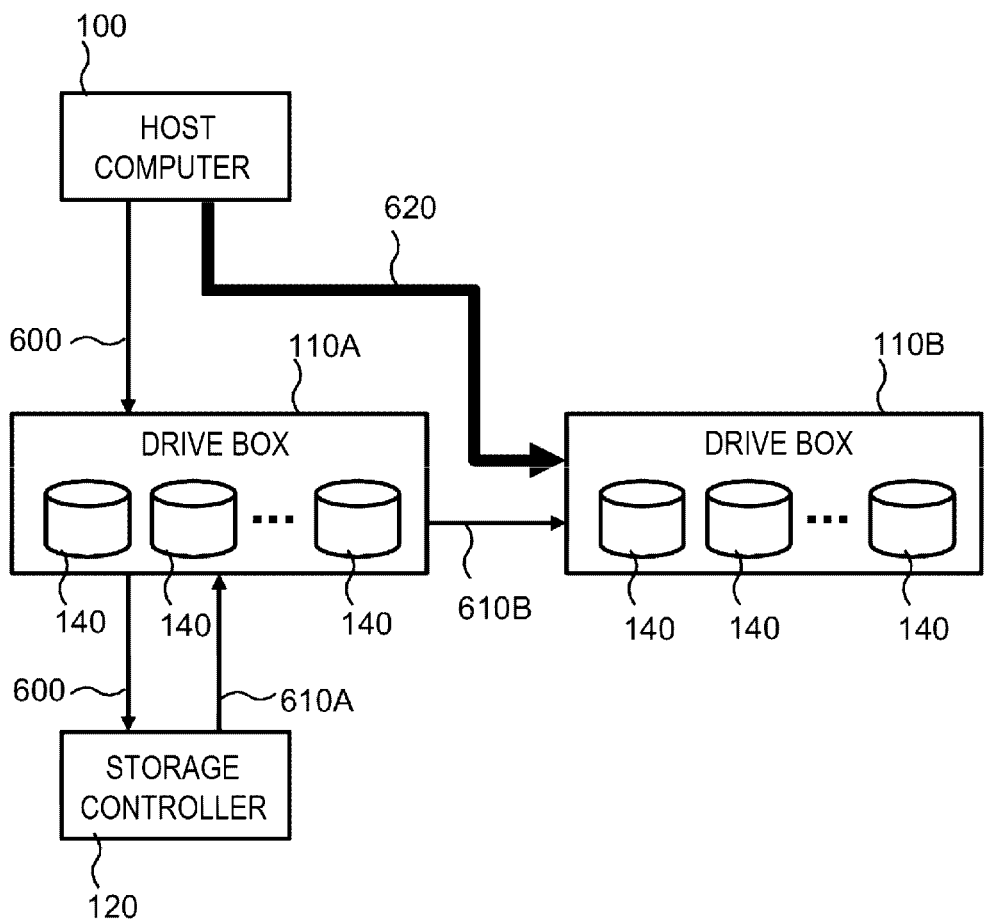
FIG. 11 is a diagram showing a data arrangement determination table according to the first embodiment.
FIG. 12 is a diagram showing an outline of path addition to a host in a method of executing a host command according to a second embodiment.

FIG. 11 shows an access frequency table for determining the data arrangement according to the first embodiment.

In the data arrangement optimization processing 400 of the storage controller 120, for example, an access frequency is used as a determination element. The storage controller 120 uses the access frequency table of an access frequency 640, a target drive box 650, and a data movement determination 660. When it is determined that the access frequency 640 is equal to or less than a threshold and the access frequency is low, when the drive box 110 storing the data is an issuing source of the command 600, the data movement determination 660 determines that the data movement is performed to another drive box 110.

When it is determined that the access frequency 640 is equal to or less than the threshold and the access frequency is low, when the drive box 110 storing the data is not the issuing source of the command 600 and is another drive box 110, the data movement determination 660 determines that no data movement is performed.

When it is determined that the access frequency 640 is greater than the threshold and the access frequency is high, when the drive box 110 storing the data is the issuing source of the command 600, the data movement determination 660 determines that no data movement is performed.

When it is determined that the access frequency 640 is greater than the threshold and the access frequency is high, when the drive box 110 storing the data is not the issuing source of the command 600 and is another drive box 110, the data movement determination 660 determines that the data movement is performed to the drive box 110 that is the issuing source of the command 600.

Although the present data arrangement determination table has been described based on the access frequency, these are examples for illustrating the invention and are not intended to limit the scope of the invention to only the present embodiment.

For example, it is possible to determine with an access method such as a random access and a sequential access instead of the access frequency. Since the random access emphasizes response time, a determination may be made such as arranging data in a drive box 110 close to the host computer 100, and since the sequential access does not emphasize the response time, a determination may be made such as arranging data in a drive box 110 far from the host computer 100.

In addition, depending on whether the data is backup data or not, when it is backup data, the backup data may be determined to be put together, and may be arranged in a drive box 110 for backup, and data other than backup data may be arranged in a drive box 110 that I not for backup.

In addition, when a plurality of applications 270 are used in the host computer 100, in accordance with required performance of the applications 270, data of the applications 270 that emphasizes the response time may be determined to be arranged in a drive box 110 close to the host computer 100, and data of the application 270 that does not emphasize the response time may be determined to be arranged in a drive box 110 far from the host computer 100.

As described above, according to the first embodiment, in the configuration in which the data is directly transferred between the host computer and the drive box, expansion of capacity by adding the drive or the like can be implemented without changing the setting of the host computer. Further, since the data transfer between the host computer and the drive box can be executed without changing the setting of the host computer even after the expansion of the drive capacity, an I/O request for the drive box of the host computer can be processed at high speed. This also contributes to lowering of energy consumption of the information system shown in FIG. 1, and can prevent loss of business opportunities for the user of the host computer 100.

According to the data transfer according to the first embodiment, since the capacity can be added without changing the setting of the host computer, it is possible to adopt a configuration that supports the thin provisioning function.

Since the data transfer processing is performed by the two-stage transfer according to the first embodiment, the capacity can be expanded without changing the correspondence between the subsystem 410 in which the NS 440 is defined and the physical port 430.

Furthermore, according to the first embodiment, it is possible to reduce the frequency of the two-stage transfer and prevent an increase in latency or network traffic by data arrangement optimization between the drive box close to the host computer and the added drive box.

Second Embodiment

FIG. 12 is a diagram showing an outline of path addition to a host in a method of executing a host command according to a second embodiment.

In an information system according to the second embodiment, for example, when another application 270 attempts to use the capacity of the drive box 110A, in order to prepare the capacity of the drive box 110A used in the original application 270, a new path may be added between the host computer 100 and the added drive box 110B, and may be shown to the original application 270 as the NS 440 which is a copy destination.

Points not specifically mentioned in the system according to the second embodiment are the same as those of the first embodiment.

For example, the original application 270 of the host computer 100 issues the command 600 to the drive box 110A via the initiator driver 280C. The drive box 110A receives the command 600 by the target driver 290B, and transfers the command 600 to the target driver 290 of the storage controller 120 via the initiator driver 280B with the host command transfer processing 340. The storage controller 120 performs the host command processing 260. Here, in the second embodiment, assuming that the target data is in the drive box 110A, for example, assuming a data write from the host computer 100, in the data arrangement optimizing processing 400 of the storage controller 120, the drive box 110B is determined to be the data optimal position instead of the drive box 110A for which the data transfer request is stored.

The storage controller 120 starts the data transfer control 300A, transmits the data transfer command 610A to the drive box 110A, and starts the data transfer control 300 via the command processing 390 of the drive box 110A. Here, in order to store the target data in the drive box 110B, the drive box 110A starts the two-stage transfer processing 350, and issues the data transfer command 610B to the target driver 290B of the drive box 110B via the initiator driver 280B.

The drive box 110B receives the data transfer command 610B, performs the command processing 390, and stores data to be written with the original application 270 of the host computer 100 in the drive box 110B.

After the transfer of the drive box 110B is completed, the drive box 110A notifies the storage controller 120 and the original application 270 of the host computer 100 of the completion of the data transfer.

Another method may be taken in which the storage controller 120 determines that data should be stored in the drive box 110B, and issues the data transfer command 610A to the drive box 110A. The drive box 110A receives the data transfer command 610A and instructs the original application 270 or the initiator driver 280C of the host computer 100 to transfer data 620 to the drive box 110B.

Accordingly, the optimal data arrangement can be performed while minimizing the load of the command 600 and the data transfer between the drive box 110A, the drive box 110B, and the storage controller 120.

In addition, since the free capacity of the drive box 110A is increased, another application 270 can be used.

Although two embodiments have been described, these are exemplifications for illustrating the invention, and the invention is not limited to the above-described embodiments, and includes various modifications. For example, the embodiments described above have been described in detail for easy understanding of the invention, and the invention is not necessarily limited to those including all the configurations described above. A part of the configuration of one embodiment can be replaced with the configuration of another embodiment, and the configuration of another embodiment can be added to the configuration of one embodiment. Apart of the configuration of one embodiment may be added, deleted, or replaced with another configuration.

For example, FIG. 13 shows a configuration example of network commonalization of the information system according to the second embodiment.

The host computer 100, the storage controller 120, and the drive box 110 may be connected to the network 130.

For example, the storage controller 120 may be software defined storage, and the host computer 100 may be a virtual server.

Further, in a case where the information system is used for an enterprise, each element, path, and the like are made redundant, and even if a failure occurs in one of them, the information system can be continuously operated. Therefore, loss of business opportunities for the user can be prevented.

What is claimed is:

1. A storage system comprising:
a plurality of drive boxes each of which is configured to be connected via a network to a computer device that transmits a command for data read or data write, each of the drive boxes comprising a drive that is a storage device, each drive box comprising at least one drive box processor and at least one drive box storage drive; and
a first storage controller comprising a first storage controller processor, connected to the plurality of drive boxes, and a second storage controller comprising a second storage controller processor connected to the plurality of drive boxes and to the first storage controller, wherein
a first drive box among the plurality of drive boxes is configured to provide a first storage region to the computer device,
the first storage controller is configured to store an address management table for managing correspondence between the first storage region and a physical storage region of the drives constituting the first storage region,
the first drive box is configured to, when receiving a command for the first storage region from the computer device, transfer the command to the first storage controller,
the first storage controller is configured to, after receiving the command, generate a data transfer command including information of a data storage destination based on the address management table, and transfer the data transfer command to the first drive box,
the first drive box is configured to, after receiving the data transfer command, when the data storage destination included in the data transfer command is a second drive box among the plurality of drive boxes, transfer the data transfer command to the second drive box, and
wherein the second storage controller is redundant with the first storage controller, and
wherein the second storage controller stores a copy of the address management table.

2. The storage system according to claim 1, wherein the first storage region is a name space in NVMe or an LU in SCSI.

3. The storage system according to claim 1, wherein the storage controller is configured to:
when determining that a storage region of the drives constituting the first storage region is insufficient,
update the address management table to a state where a capacity of the physical storage region expanded by increasing a capacity of a POOL that provides the first storage region, by adding a new drive to the first drive box, or by adding a new drive box can be associated with the first storage region.

4. The storage system according to claim 3, wherein the storage controller is configured to:
determine either one of the first drive box and the second drive box as a storage destination of target data based on an access frequency of the target data of the command from the computer device.

5. The storage system according to claim 3, wherein the first drive box includes a control unit connected to another drive box among the plurality of drive boxes and the computer device, and
the control unit of the first drive box is configured to, after receiving the data transfer command, when a storage destination of target data included in the data transfer command is the second drive box among the plurality of drive boxes, transfer the data transfer command to the second drive box, and store the target data in the drive of the first drive box.

6. The storage system according to claim 5, wherein the storage controller is configured to:
when the new drive box is added to expand the capacity of the physical storage region, at a time of transferring the data transfer command to the first drive box, determine whether data is to be stored in the added drive box, and
when determining that the data is to be stored in the added drive box, instruct the computer device to use a new path between the added drive box and the computer device.

7. A plurality of drive boxes configured to be connected via a network to a computer device that transmits a command for data read or data write via a first storage controller, each of the drive boxes comprising a respective drive that is a storage device and a respective processor, wherein
a first drive box among the plurality of drive boxes is configured to:
provide a first storage region to the computer device, and
when receiving a command for the first storage region from the computer device, transfer the command to a second drive box among the plurality of drive boxes based on an address management table for managing correspondence between the first storage region and a physical storage region of the drives constituting the first storage region,
and the plurality of drive boxes are first drive box is configured to be connected to the first storage controller comprising a first storage controller processor, and a second storage controllercomprising a second storage controller processor, wherein the first storage controller and the second storage controller are connected to each other to provide redundancy, and wherein the first storage controller and the second storage controllereach store a copy of the address management table.

8. The drive box according to claim 7, wherein
the first drive box includes a control unit connected to another drive box among the plurality of drive boxes and the computer device configured to process a command from the computer device, and
the first storage region provided to the computer device by the control unit is a name space in NVMe or an LU in SCSI.

9. A data transfer method of a storage system comprising:
a plurality of drive boxes each of which is configured to be connected via a network to a computer device that issues a command for data read or data write each drive box comprising at least one drive box processor and at least one drive box storage drive; and
a first storage controller comprising a first storage controller processor, connected to the plurality of drive boxes, and a second storage controller comprising a second storage controller processor connected to the plurality of drive boxes and to the first storage controller, wherein
a first drive box among the plurality of drive boxes is configured to provide a first storage region to the computer device,
the first storage controller is configured to store an address management table for managing correspondence between the first storage region and a physical storage region of the drive boxes constituting the first storage region,
the first drive box is configured to, when receiving a command for the first storage region from the computer device, transfer the command to the first storage controller,
the first storage controller is configured to, after receivingthe command, generate a data transfer command including information of a data storage destination based on the address management table, and transfer the data transfer command to the first drive box, and
the first drive box is configured to, after receiving the data transfer command, when the data storage destination included in the data transfer command is a second drive box among the plurality of drive boxes, transferthe data transfercommand to the second drive box,
wherein the second storage controller is redundant with the first storage controller, and
wherein the second storage controllerstores a copy of the address management table.

* * * * *